(12) United States Patent
Park et al.

(10) Patent No.: US 10,908,985 B2
(45) Date of Patent: Feb. 2, 2021

(54) IMAGE DISPLAY APPARATUS AND DRIVING METHOD THEREOF

(71) Applicant: SAMSUNG ELECTRONICS CO., LTD., Suwon-si (KR)

(72) Inventors: Yoojin Park, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 192 days.

(21) Appl. No.: 16/250,227

(22) Filed: Jan. 17, 2019

(65) Prior Publication Data
US 2019/0220343 A1   Jul. 18, 2019

(30) Foreign Application Priority Data
Jan. 18, 2018   (KR) .................... 10-2018-0006535

(51) Int. Cl.
G06F 11/00 (2006.01)
G06F 11/07 (2006.01)

(52) U.S. Cl.
CPC ...... *G06F 11/0793* (2013.01); *G06F 11/0733* (2013.01); *G06F 11/0751* (2013.01); *G09G 2330/026* (2013.01); *G09G 2360/144* (2013.01)

(58) Field of Classification Search
CPC ....... G09G 2360/144; G09G 2330/026; G09G 2330/027; G06F 11/0703; G06F 11/0733; G06F 11/0736; G06F 11/0751; G06F 11/0766; G06F 11/0793
See application file for complete search history.

(56) References Cited

U.S. PATENT DOCUMENTS

| 8,514,231 | B2 | 8/2013 | Kim et al. |
| 10,382,716 | B2 | 8/2019 | Na et al. |
| 2011/0206353 | A1 | 8/2011 | Yeo |
| 2013/0061090 | A1 | 3/2013 | Lee |
| 2013/0194500 | A1 | 8/2013 | Na et al. |

(Continued)

FOREIGN PATENT DOCUMENTS

| EP | 1677193 A3 | 11/2012 |
| EP | 2871788 A1 | 5/2015 |

(Continued)

OTHER PUBLICATIONS

Communication dated Jun. 4, 2020, from the European Patent Office in counterpart European Application No. 19741556.5.

(Continued)

*Primary Examiner* — Michael Maskulinski
(74) *Attorney, Agent, or Firm* — Sughrue Mion, PLLC

(57) ABSTRACT

An image display apparatus and a driving method thereof are provided. The image display apparatus includes a memory including instructions; and a processor configured to execute the instructions to: in response to a request for executing a designated application being received, identify a type of error occurred in the image display apparatus, and based on the type of error identified by the processor, determine whether to: execute the designated application and recover from the error after the designated application is executed by the processor, or recover from the error and execute the designated application after recovering from the error.

20 Claims, 10 Drawing Sheets

(56) References Cited

U.S. PATENT DOCUMENTS

| | | | | |
|---|---|---|---|---|
| 2014/0152818 A1* | 6/2014 | Na | ................. | G06K 9/6202 |
| | | | | 348/143 |
| 2017/0199795 A1* | 7/2017 | Allen | ................. | G06F 11/1438 |
| 2017/0220357 A1 | 8/2017 | Choi et al. | | |
| 2017/0337895 A1* | 11/2017 | Kosugi | ................. | G06F 1/3265 |
| 2018/0349231 A1* | 12/2018 | Panda | ................. | G06F 11/1438 |

FOREIGN PATENT DOCUMENTS

| | | |
|---|---|---|
| KR | 10-0691120 B1 | 3/2007 |
| KR | 10-2013-0026739 A | 3/2013 |
| KR | 10-2013-0087353 A | 8/2013 |
| KR | 10-1370344 B1 | 3/2014 |
| KR | 10-1437448 B1 | 9/2014 |

OTHER PUBLICATIONS

International Search Report and Written Opinion (PCT/ISA/210 and PCT/ISA/237), dated May 3, 2019 by International Searching Authority in International Application No. PCT/KR2019/000626.

\* cited by examiner

IMAGE DISPLAY APPARATUS AND DRIVING METHOD THEREOF

CROSS-REFERENCE TO RELATED APPLICATION(S)

This application is based on and claims priority under 35 U.S.C. § 119 to Korean Patent Application No. 10-2018-0006535, filed on Jan. 18, 2018, in the Korean Intellectual Property Office, the disclosure of which is incorporated by reference herein in its entirety.

BACKGROUND

1. Field

The disclosure relates to image display apparatuses and driving methods thereof, and more particularly, to a driving method in connection with recovering from an error of an image display apparatus and the image display apparatus using the driving method thereof.

2. Description of Related Art

An image display apparatus displays images to be viewed by users. For example, a user may watch a broadcast on an image display apparatus. The image display apparatus displays on a display, a broadcast selected by the user from among broadcasting signals transmitted from a broadcasting station.

Analog broadcasting has been changed worldwide to digital broadcasting. Digital broadcasting is used for broadcasting digital images and digital sound signals. Compared to analog broadcasting, digital broadcasting is less susceptible to external noise, and thus, has less data loss, is efficient in error correction, has a higher resolution, and provides images of higher quality. Unlike analog broadcasting, a bidirectional service is available in digital broadcasting. In addition, smart televisions capable of providing various contents in addition to having a digital broadcasting function have recently been provided. Instead of being passively operated by a user's selection, smart televisions may provide items of interest to a user through self-analysis without user's manipulation.

SUMMARY

A user may recover an image display apparatus from a system error or the like by rebooting the image display apparatus by using a power key. Recently, an image display apparatus that is not turned off when a power key is pressed but is changed to another mode (for example, changed from a normal mode to an information mode) has been developed. However, an image display apparatus capable of operating in an information mode does not use a method of recovering from a system error in such a way to minimize user's inconvenience.

Provided is an image display apparatus capable of operating in an information mode, where the image display apparatus uses a system error recovery method.

Provided is a driving method of an image display apparatus capable of operating in an information mode, where the image display apparatus uses a system error recovery method.

Additional aspects will be set forth in part in the description which follows and, in part, will be apparent from the description, or may be learned by practice of the presented embodiments.

In accordance with an aspect of the disclosure, an image display apparatus includes: a memory storing instructions; and a processor configured to execute the instructions to: execute an application selected by a user, identify an error type of the image display apparatus when receiving a request for executing a particular application during an execution of the selected application, and based on the identified error type, determine whether to execute the particular application and then recover from an error of the image display apparatus or to recover from the error of the image display apparatus and then execute the particular application.

The request for executing a particular application may include a power key input, but is not limited thereto. Also, the particular application may be an application displaying at least one of date information, time information, temperature information, weather information, and schedule information, but is not limited thereto.

The processor may identify the error type of the image display apparatus by identifying at least one of a free memory space for executing the particular application, a use rate of the processor, and whether the particular application has an operating error.

When recovering from the error of the image display apparatus after executing the particular application based on the identified error type, the processor may further be configured to execute the instructions to modify a point of time of executing a recovery operation based on external conditions. For example, the processor may further be configured to execute the instructions to: receive a signal indicating a location of a mobile terminal from the mobile terminal of a user, perform the recovery operation when a distance between the mobile terminal and the image display apparatus, which is identified based on the location, is greater than a threshold. Alternatively, the image display apparatus may further include at least one sensor configured to sense the external conditions, and the processor may be further configured to execute the instructions to execute the recovery operation when a sensed value of the sensor is less than a preset threshold value.

When the particular application is executed after recovering from the error of the image display apparatus based on the identified error type, the processor may be further configured to execute the instructions to perform the recovery operation immediately regardless of external conditions.

In addition, the processor may recover from the error by performing at least one of cold-booting the image display apparatus and closing at least one program, but is not limited thereto.

In accordance with another aspect of the disclosure, an image display apparatus includes: a memory storing instructions; and a processor configured to execute the instructions to: in response to receiving a request for executing a second application during an execution of a first application, recover from an error of the image display apparatus after executing the second application, when the error has already occurred before the second application is executed.

The request for executing a particular or second application may be a power key input, but is not limited thereto. In addition, the particular or second application may be an application displaying at least one of date information, time information, temperature information, weather information, and schedule information, but is not limited thereto.

The processor may recover from the error by performing at least one of cold-booting the image display apparatus and closing at least one program.

The processor may further be configured to execute the instructions to perform a suspend operation after recovering from the error. For example, the memory may include a non-volatile memory and a volatile memory, and the processor may recover from the error by storing job details during the execution of the first application in a non-volatile memory and then cold-booting the image display apparatus, where the processor moves the job details stored in the non-volatile memory to the volatile memory when performing the suspend operation.

The processor may further be configured to execute the instructions to modify a point of time of executing an operation of recovering from the error based on external conditions. The processor may further be configured to execute the instructions to: receive a signal indicating a location of a mobile terminal from the mobile terminal of a user, and perform the recovery operation when a distance between the mobile terminal and the image display apparatus, which is identified based on the location, is greater than a threshold. Alternatively or in addition, the image display apparatus may further include at least one sensor sensing external conditions, and the processor may further be configured to execute the instructions to execute the recovery operation when a sensed value of the sensor is less than a preset threshold value.

The processor may further be configured to execute the instructions to identify, before executing the particular application, an error type of the image display apparatus by identifying a free memory space for executing the particular application, a use rate of the processor, and whether the particular application has an operating error.

In accordance with an aspect of the disclosure, a method of operating an image display apparatus includes receiving a request for executing a particular application; identifying an error type of the image display apparatus; and based on the identified error type, executing the particular application and then recovering from the identified error of the image display apparatus or recovering from the identified error of the image display apparatus and then executing the particular application.

The identifying of the error type may include: identifying a free memory space for executing the particular application, a use rate of the processor, and whether the particular application has an operating error.

When the executing of the particular application is performed and then the recovering from the error of the image display apparatus is performed based on the identified error type, the method may further include: modifying a point of time of executing the recovering based on external conditions, where the external conditions may include at least one of a position of a mobile terminal of a user, an illuminance around the image display apparatus, and a motion around the image display apparatus.

The request for executing a particular application may include a power key input, and the particular application may be an application displaying at least one of date information, time information, temperature information, weather information, and schedule information, but is not limited thereto.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
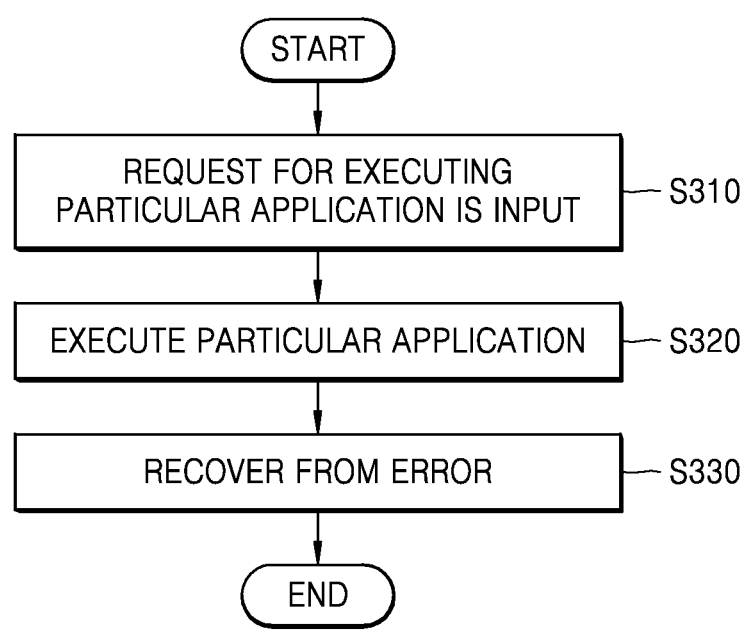
FIG. 1 is a flowchart illustrating a method of operating an image display apparatus according to a first embodiment.

Reference will now be made in detail to embodiments, examples of which are illustrated in the accompanying drawings. The advantages and features of the present disclosure and methods of achieving the advantages and features will be described more fully with reference to the accompanying drawings, in which exemplary embodiments of the present disclosure are shown. The present disclosure may, however, be embodied in many different forms and should not be construed as being limited to the embodiments set forth herein; rather these embodiments are provided so that this disclosure will be thorough and complete, and will fully convey the concept of the present disclosure to one of ordinary skill in the art.

Unless defined differently, all terms used in the description including technical and scientific terms can have the same meaning as generally understood by those skilled in the art. The terminology used herein is for the purpose of describing particular embodiments only and is not intended to be limiting of embodiments. As used herein, the singular forms "a," "an" and "the" are intended to include the plural forms as well, unless the context clearly indicates otherwise. The terminology used in this document is merely used to describe some embodiments, and is not intended to limit other embodiments.

It will be further understood that the terms "has", "may have", "includes" or "may include," when used in this specification, specify the presence of stated features, such as numerical values, operations, elements, and/or components, but do not preclude the presence or addition of one or more other features.

Throughout the specification, it will also be understood that when an element is referred to as being "(operatively, electrically or communicatively) coupled with/to" or "connected to" another element, it can be directly coupled to the other element, or it can be coupled to the other element and intervening elements may be present unless otherwise specified herein.

As used herein, the term "and/or" includes any and all combinations of one or more of the associated listed items. Expressions such as "at least one of," when preceding a list of elements, modify the entire list of elements and do not modify the individual elements of the list.

Hereinafter, the present disclosure will be described in detail by explaining some embodiments of the present disclosure with reference to the accompanying drawings.

An operating method of an image display apparatus according to embodiments of the present disclosure may be applied regardless of a type or form of the image display apparatus, as long as the image display apparatuses is capable of operating in an information mode. The image display apparatus may be, but is not limited to, a mobile phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, a mobile medical device or a wearable device (e.g., a smart glasses, a head-mounted device (HMD), electronic clothes, electronic bracelets, electronic necklaces, electronic appcessory, electronic tattoo, smart mirrors, smart frames, and smart watches). The image display apparatus may be fixed or movable, or a digital broadcast receiver or a set-top box. In addition, the image display apparatus may be implemented not only as a flat display device but also as a curved display apparatus having a screen with curvature or a flexible display apparatus having adjustable curvature, but is not limited thereto. Output resolution of the image display apparatus may be, for example, a High Definition (HD) class, a Full HD class, an Ultra HD class, or a resolution class more clear than the Ultra HD class.

Figure 2:
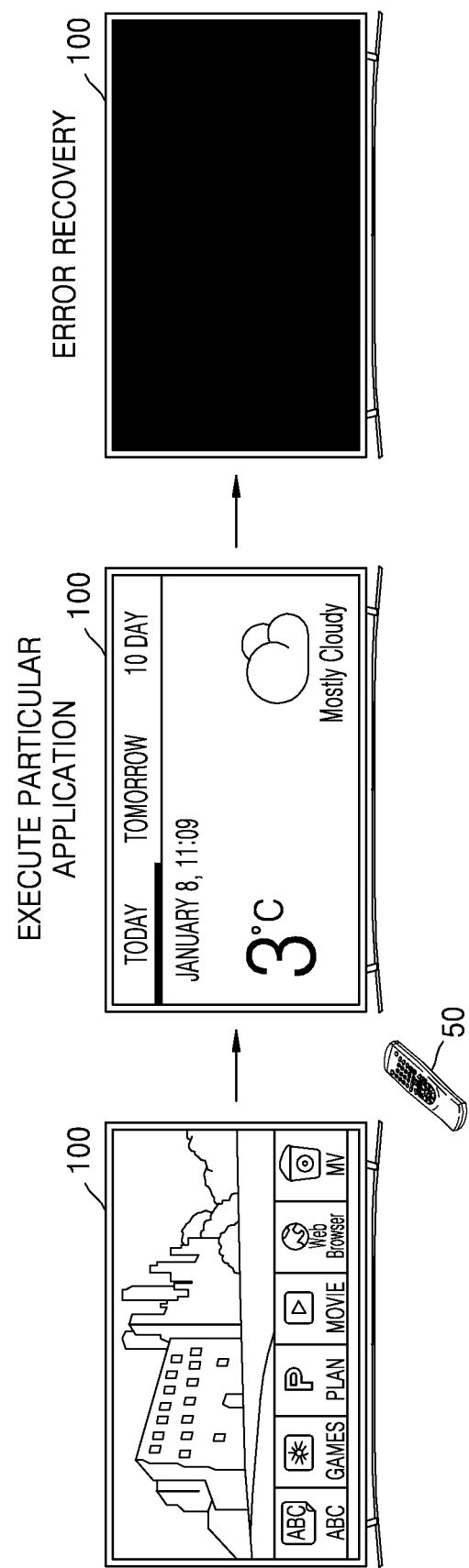
FIG. 2 is a diagram view illustrating a method of operating an image display apparatus such as the method described above with reference to FIG. 1, according to a first embodiment.
Figure 3:
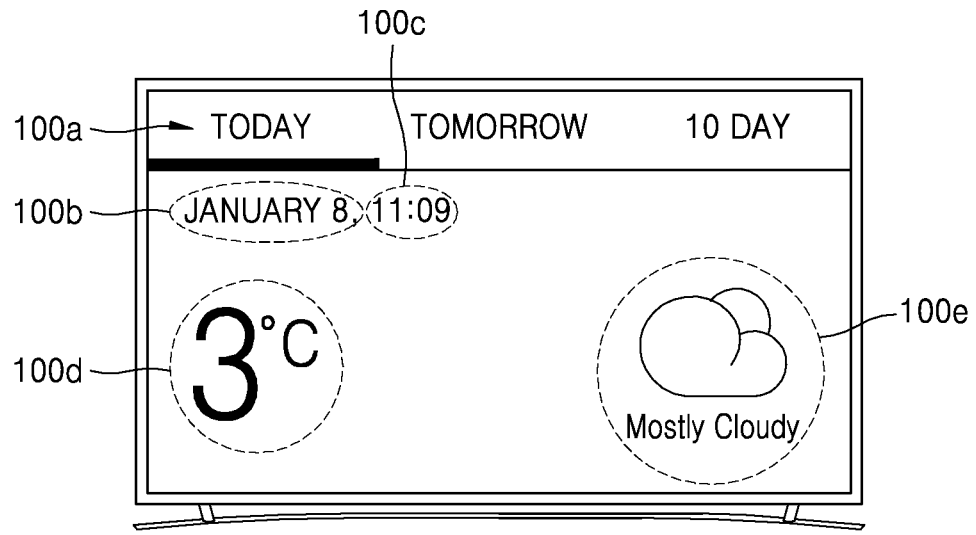
FIG. 3 is a view illustrating a screen during an execution of a particular application according to an embodiment.

FIG. 1 is a flowchart illustrating a method of operating an image display apparatus 100 according to a first embodiment. FIG. 2 is a diagram illustrating a method of operating an image display apparatus such as the operating method of FIG. 1, according to the first embodiment. FIG. 3 is a view illustrating a screen during an execution of a particular application according to the first embodiment.

First, referring to FIGS. 1 and 2, a request for executing a particular application is input or provided to the image display apparatus 100 (in operation S310).

While the image display apparatus 100 is operating in a normal mode (for example, during an execution of an application selected by a user), a request for executing a particular application may be input or provided to the image display apparatus 100. In the normal mode, the image display apparatus 100 may perform various operations such as displaying a broadcast selected by a user from among broadcasting signals transmitted by a broadcasting station, displaying an image selected by a user (a moving image or a still image), driving various application programs, or accessing the Internet.

The particular application, which will be described in more detail later, may be an application displaying at least one of date information, time information, temperature information, weather information, and schedule information, but is not limited thereto. In this specification, a state in which the particular application is executed will be referred to as an "information mode."

Unlike the diagram of FIG. 2, the image display apparatus 100 may also receive a request for executing a particular application (in other modes, modes other than a normal mode). For example, a particular application may be executed in various modes such as a suspend mode, a free-power mode, or the like.

A request for executing a particular application may be input in various manners. For example, a user input for a request for executing a particular application (or a request for changing to an information mode) may be input via a control device 50 (FIG. 2). The control device 50 may transmit a control signal to the image display apparatus 100 via short-range communication such as infrared communication or Bluetooth. The control device 50 may be implemented by using a remote control, a portable terminal, or the like.

The control device 50 may include at least one input module such as a key (or a button) or a touchpad for receiving a request for changing to an information mode, a microphone for receiving a sound request for changing to an information mode, and an acceleration sensor for receiving a gesture request for changing to an information mode, and when a request for changing to an information mode is received via the input module, the control device 50 may transmit to the image display apparatus 100 a control signal for changing to an information mode.

Alternatively, the image display apparatus 100 may also include an input module via which a request for executing a particular application (or a request for changing to an information mode) is directly input. The input module may include a key (or a button) mounted in a housing of the image display apparatus 100, a sensor such as a camera for sensing a gesture of a user, a microphone for receiving a sound instruction of a user, and the like. The user may also input a request for changing to an information mode by using the input module of the image display apparatus 100.

In detail, for example, a user may input a request for executing a particular application (or a request for changing to an information mode) via a power key. The power key may be installed in the control device 50 or the image display apparatus 100. When the power key is pressed in a normal mode, the normal mode is changed to an information mode, and conversely, when the power key is pressed in the information mode, the information mode is changed to the normal mode. In addition, when the power key is pressed in a suspend mode (that is, during execution of a suspend operation), the suspend mode is changed to a normal mode. The suspend mode is a type of a standby mode in which power of the image display apparatus 100 is not completely turned off but the power consumption is minimized. The suspend mode will be described in more detail later, according to an embodiment.

A user may also input a conversion command for changing the image display apparatus 100 to an information mode by using an additional information mode key besides the power key for requesting conversion to the information mode. Alternatively, the conversion command for changing the image display apparatus 100 to an information mode may also be input by simultaneously pressing two or more keys for different uses.

Alternatively, the power key may have both functions for a request for executing a particular application (a request for changing to an information mode) and a conversion request for a suspend mode. For example, when the power key is pressed for a preset period or a shorter period than the preset period, the normal mode is changed to an information mode. On the other hand, when the power key is pressed for the preset period or for a longer period than the preset period, the normal mode may be changed to the suspend mode.

Embodiments associated with various user inputs of executing a particular application (or conversion to an information mode) have been described above, according to an embodiment. Next, an operation of the image display apparatus 100 performed in response to receipt of a request for executing a particular application will be described, according to an embodiment. Even though an error already occurred in the image display apparatus 100 before the request for executing a particular application is input, when the circumstances allow execution of the particular application (that is, a situation where entry into an information mode is possible), the image display apparatus 100 immediately executes the particular application in response to the request for executing the particular application (that is, a request for changing to an information mode (in operation S320)).

That is, as illustrated in FIG. 2, when a software error occurs in a normal mode and recovery from the error is required, and the request for changing to an information mode is input, the image display apparatus 100 enters first the information mode to display previously defined information and then an error recovery process may be performed. The error recovery process may be performed while in the information mode on a background or may be performed before the image display apparatus 100 is changed to another mode from the information mode. For example, when conditions for changing the image display apparatus 100 from the information mode to a suspend mode are met, the error recovery process may be performed.

A state in which the above-described particular application is executed (that is, an information mode) will be described now. Referring to FIG. 3, the image display apparatus 100 may display, in an information mode, at least one of date information 100b, time information 100c, temperature information 100d, weather information 100e, and schedule information (not shown). Alternatively, the image display apparatus 100 may display image information associated with a user or designated by the user in the information mode. The image information may be a picture of the user or a picture desired by the user.

The particular application will be described in more detail now, according to an embodiment. The particular application may be a special-purpose application program used to display an information mode. A particular application may be automatically executed via an operating program of the image display apparatus 100, and the image display apparatus 100 may enter an information mode accordingly. The operating system is, for example, an embedded operating system installed on the image display apparatus 100. The particular application program is not arbitrarily executed by the user, and thus, may be regarded as a special-purpose application program distinguished from other various application programs executed in a normal mode. When the image display apparatus 100 is changed from the normal mode to the information mode, for rapid resumption of a normal mode later, job details of the normal mode (or a suspend image) may be frozen in a volatile memory of the image display apparatus 100 (for example, a dynamic random access memory (DRAM). In this case, the image display apparatus 100 may quickly resume operating in a normal mode later based on a Suspend-to-RAM technique. Resumption conducted by using the Suspend-to-RAM technique will be described in detail later, according to an embodiment.

In addition, while a particular application is being executed in an information mode, only limited computer resources may be used compared to a normal mode. In the information mode, a user may perform limited operations such as inputting an instruction for mode conversion. That is, a user may convert the information mode to a normal mode. The limited operations may be designated or modified by a manufacturer or a user. For example, a user may also modify a section 100a in FIG. 3. Referring to FIG. 3, changing from a section displaying information of today TODAY to a section displaying information of tomorrow TOMORROW may be designated to be performed by a user by inputting a preset key. Alternatively, in an information mode, even when the user does not input an additional input, when a preset period of time passes, the section displaying information of today TODAY may change to the section displaying information of tomorrow TOMORROW.

Now description will be made with reference to FIG. 1 again, according to a first embodiment. As described above, in the driving method of the image display apparatus 100 according to the embodiment, even when a system error occurs in the image display apparatus 100, when a request for executing a particular application is input to the image display apparatus 100, the image display apparatus 100 enters an information mode by executing the particular application.

The system error may, for example, be a forced termination due to an operating error (that is, when a crash occurs) of an application program that was being executed, a program not responding while being executed, a malfunction of a system driver, memory shortage (for example, memory leak), or the like.

Next, the image display apparatus 100 recovers from the error (in operation S330).

In detail, the image display apparatus 100 may use various error recovery methods. For example, the error recovery methods may include at least one of cold-booting the image display apparatus 100 and closing at least one program. Cold-booting refers to booting the image display apparatus 100 by turning off and on the image display apparatus 100. That is, cold booting refers to resetting the image display apparatus 100 by re-booting it. During the cold booting, a display of the image display apparatus 100 is in an off state (that is, a black screen).

An error recovery method may be determined according to a cause of a system error. For example, when a currently running program does not respond, error recovery may be performed by closing the not-responding program, without performing the cold-booting. In addition, the cold-booting and the closing of a program may be simultaneously performed. That is, even when the cold-booting has been performed, free memory may still be insufficient due to too many pre-installed programs that are stored in a memory.

In this case, at least some of the pre-installed programs may be forcibly shut down. For example, pre-installed programs may be classified according to a degree of importance, and programs of a predefined type may be forcibly shut down according to a capacity of a free memory.

In addition, a point of time of performing error recovery (that is, a starting point of time) may be adjusted. For example, error recovery may be performed when a preset period has passed after entering an information mode by executing a particular application. The preset period may be adjusted by a user or a manufacturer. Alternatively, error recovery may be performed after executing a particular application and sensing that a user is not using the image display apparatus 100 (or an absence of the user).

Before performing an error recovery, job details regarding a normal mode stored in a volatile memory (or a suspend image) may be stored in a non-volatile memory, and then the image display apparatus 100 may be cold-booted. For example, the job details may include at least one of a current job status of various programs that were being executed and a current status of a controller including a processor and peripheral devices. As will be described later, after resetting the image display apparatus 100 by cold-booting, job details stored in the non-volatile memory may be transferred to the volatile memory. The job details transferred, as described above, may then be used in a Suspend-to-RAM operation. In detail, when a request for executing a particular application is input during execution of a first application in a normal mode, job details generated during execution of the first application may be stored in the non-volatile memory and then the cold-booting may be performed. When performing a suspend operation, job details stored in the non-volatile memory may be transferred to the volatile memory.

As described above, in the operating method of the image display apparatus 100, according to the embodiment, even when a system error occurs in the image display apparatus 100, when the image display apparatus 100 senses a request for changing to an information mode, the image display apparatus 100 enters the information mode. When the image display apparatus 100 recovers from a system error first before entering the information mode (for example, when the image display apparatus 100 is cold-booted), the user will experience an unexpected turned-off state of the display (black screen). That is, even though normal cold-booting for recovering from the system error is performed, the user may suspect an abnormal operation of the image display apparatus 100. The image display apparatus 100 enters an information mode first despite occurrence of a system error, in order to prevent occurrence of a black screen. Accordingly, the user may be prevented from experiencing an unexpected abnormal operation of the image display apparatus 100, thereby increasing reliability of the image display apparatus 100.

Figure 4:
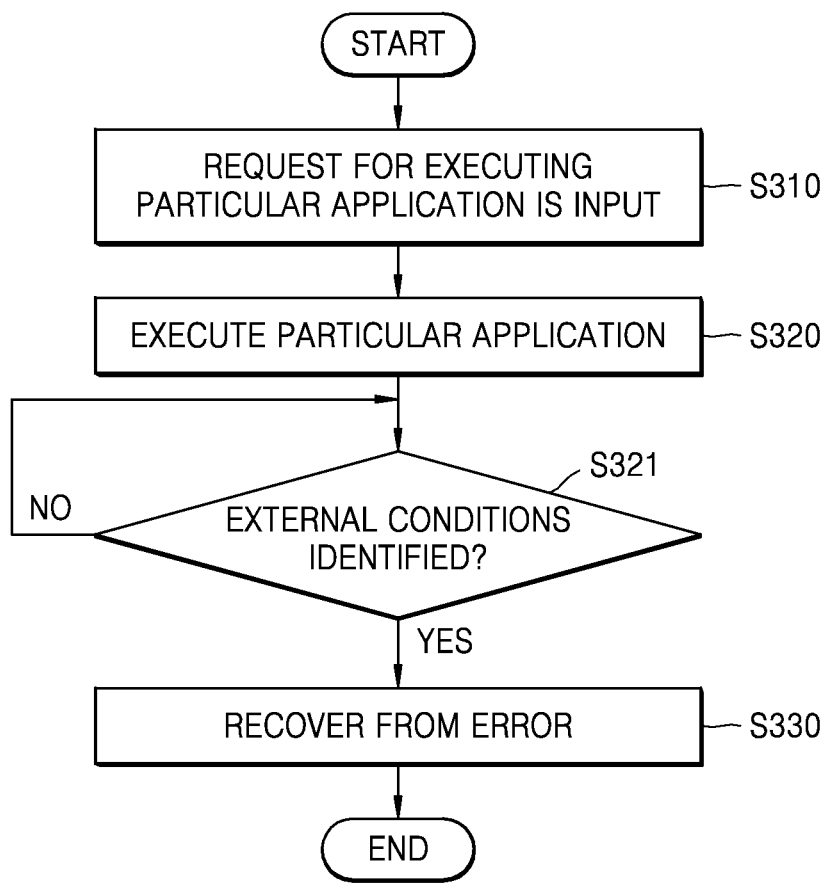
FIG. 4 is a flowchart illustrating a method of operating an image display apparatus according to a second embodiment.

FIG. 4 is a flowchart illustrating method of operating an image display apparatus 100 according to a second embodiment. For convenience of description, description will focus on differences from the embodiment of FIGS. 1 through 3.

Referring to FIG. 4, a request for executing a particular application (a request for changing to an information mode) is input (in operation S310). During execution of an application selected by a user, a request for executing a particular application may be input. For example, a request for executing a particular application may be input via keys (or buttons) installed on the control device 50 or the image display apparatus 100. A power key may be used, or an additional information mode key for a request for executing a particular application may be used.

An information mode is entered by executing the particular application (in operation S320). Even when there is a system error in the image display apparatus 100, when the image display apparatus 100 senses a request for changing to an information mode, the image display apparatus 100 enters the information mode.

Next, external conditions are identified (in operation S321).

In detail, by identifying external conditions, whether there is a sufficient time for error recovery may be determined. When it is determined that there is sufficient time, a recovery operation may be performed (that is, started). Accordingly, a point of time of performing a recovery operation may be modified based on the external conditions.

For example, when a user moves away from the image display apparatus 100 (or the user is not present), a recovery operation may be performed. For example, when an application program installed on the image display apparatus 100 is linked to a mobile terminal of a user, the image display apparatus 100 may receive a signal indicating a location of the mobile terminal from the mobile terminal via an Internet of Things (IoT) server (for example, a global positioning system (GPS) signal). A recovery operation may be performed when a distance between the mobile terminal and the image display apparatus 100, which is identified based on the location of the mobile terminal, is greater than a threshold. The recovery operation may be performed when the user is far away from the image display apparatus 100, and thus, there is sufficient time for the recovery operation. For example, the image display apparatus 100 may identify the mobile terminal's existence in the vicinity of the image display apparatus 100 by receiving signals from the mobile terminal through a Bluetooth module. Further, the image display apparatus 100 may identify the mobile terminal's absence by receiving weak signals from the mobile terminal through the Bluetooth module or by failing to detect any signals from the mobile terminal through the Bluetooth module. Accordingly, when weak signals are received from the mobile terminal through the Bluetooth module or any signals from the mobile terminal are not received through the Bluetooth module, the image display apparatus 100 may determine that the mobile terminal is absent in the vicinity of the image display apparatus 100, and thus, may perform the recovery operation.

Alternatively, the image display apparatus 100 may include at least one sensor that senses external conditions. For example, the sensor may be at least one of an illuminance sensor and a motion sensor. When a sensed value of the sensor is less than a preset threshold, a recovery operation may be performed. By sensing a lowering illuminance of the surroundings of the image display apparatus 100 by using the illuminance sensor (that is, becoming dark), it may be determined that lighting in a space where the image display apparatus 100 is installed is turned off. By using a motion sensor, it may be sensed that there is no movement around the image display apparatus 100. In this case, it may be determined that the user is not present in the space where the image display apparatus 100 is installed, and then a recovery operation may be performed.

External conditions may also be identified by using other methods than checking a position of the mobile terminal or using the illuminance sensor or the motion sensor described above.

By adjusting a point of time of performing a recovery operation as described above, while the user is unaware, the image display apparatus 100 having an information mode may recover from the system error.

As a result of identifying external conditions, when sufficient time for performing a recovery operation is ensured, the image display apparatus 100 recovers from the error (in operation S330). For example, the image display apparatus 100 recovers from the error by cold-booting the image display apparatus 100 and/or closing at least one program.

As a result of identifying external conditions, when sufficient time for performing a recovery operation is not ensured, the information mode is maintained, according to an embodiment.

Figure 5:
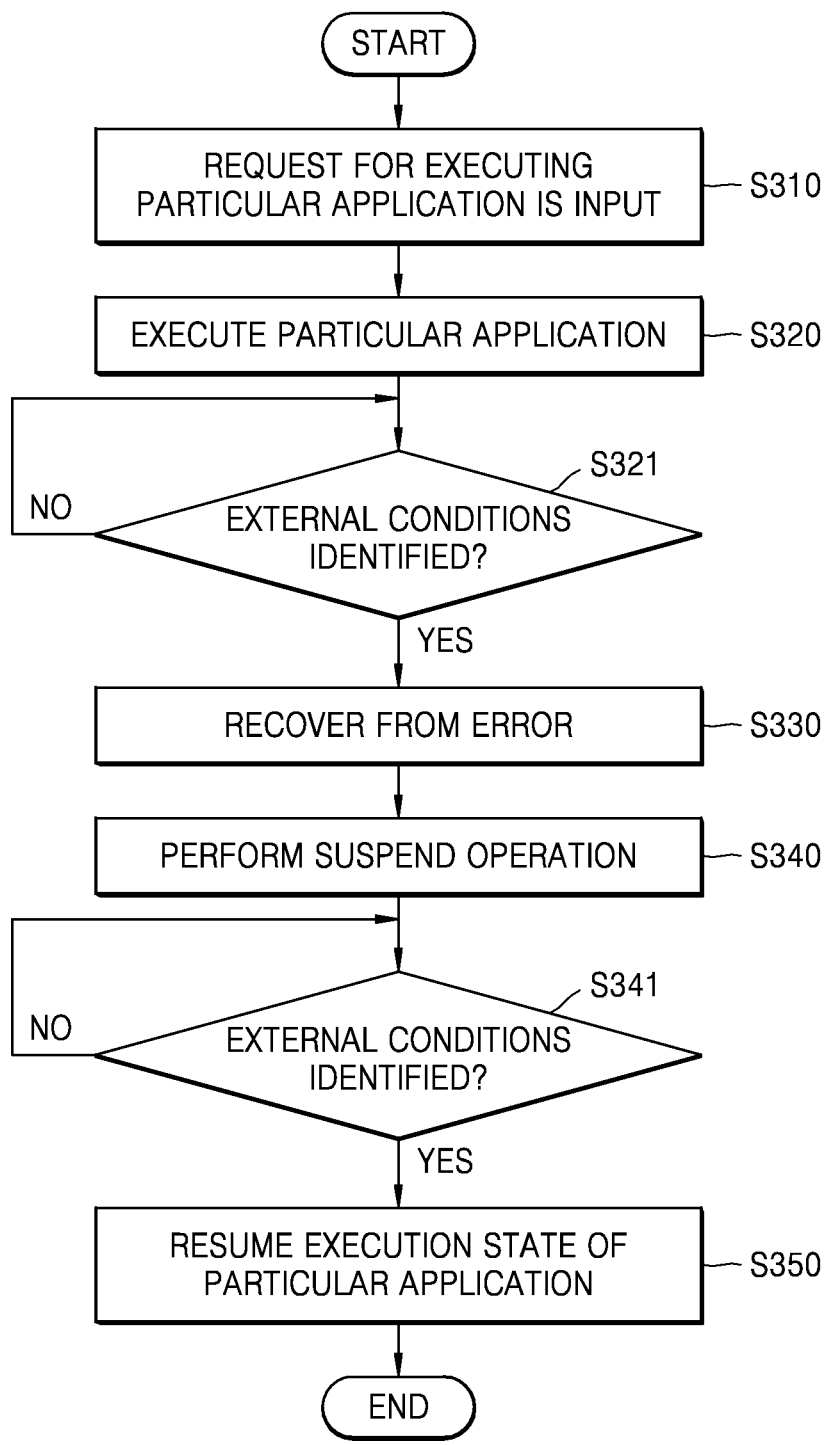
FIG. 5 is a flowchart illustrating a method of operating an image display apparatus according to a third embodiment.
Figure 6:
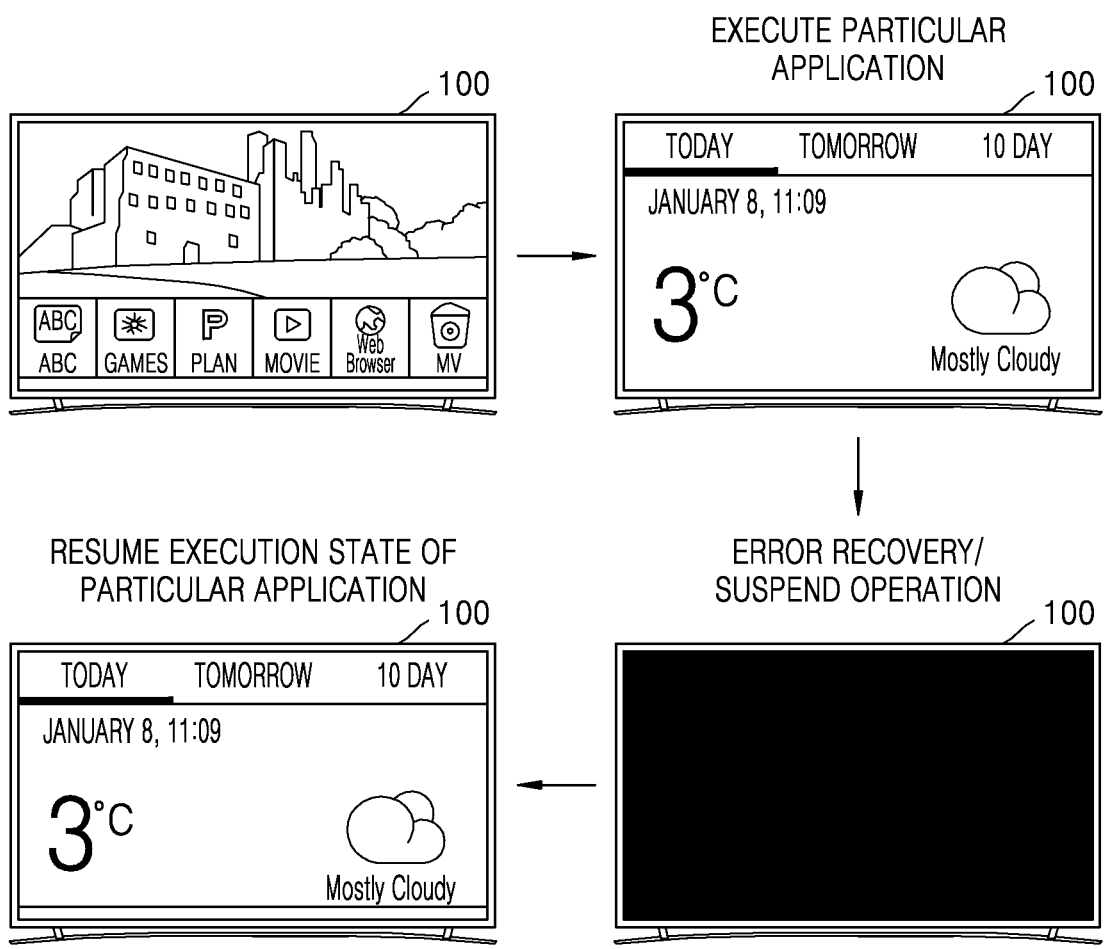
FIG. 6 is a diagram view illustrating a method of operating an image display apparatus such as the method described above with reference to FIG. 5, according to a third embodiment.

FIG. 5 is a flowchart illustrating a method of operating an image display apparatus 100 according to a third embodiment. FIG. 6 is a diagram illustrating a method of operating an image display apparatus such as an operating method of FIG. 5, according to a third embodiment. For convenience of description, description will focus on differences from the embodiments of FIGS. 1 through 4.

First, referring to FIGS. 5 and 6, a request for executing a particular application (request for changing to an information mode) is input to or provided to the image display apparatus 100 (in operation S310). The request for executing a particular application may be made, for example, by using a power key or an information mode key for executing the particular application.

Next, the image display apparatus 100 enters the information mode by executing the particular application (in operation S320).

Next, external conditions are checked (in operation S321). As a result of checking the external conditions, when sufficient time for performing a recovery operation is ensured, an error recovery operation of the image display apparatus 100 is performed. When sufficient time is not provided, the information mode is maintained.

Next, the image display apparatus 100 recovers from the error (in operation S330). For example, the image display apparatus 100 may recover from the error by cold-booting and/or closing at least one program. In particular, before performing an error recovery operation, job details regarding a normal mode stored in a volatile memory (or a suspend image) may be stored in a non-volatile memory, and then the image display apparatus 100 may be cold-booted. The suspend image may include, for example, at least one of a current job status of various programs that were being executed in a normal mode (job details of a first application being executed in the normal mode) and a current status of a controller including a processor and peripheral devices. In addition, the suspend image may include a memory address to be performed first by a main processor when returning to the normal mode. The memory address may be a kernel wakeup vector (KWV) value of an operating system (OS).

Next, after recovering from the error of the image display apparatus 100, a suspend operation is performed (in operation S340).

In detail, the suspend operation may be performed using various methods, for example, a suspend-to-RAM operation or a suspend-to-disk operation. Hereinafter, a Suspend-to-RAM operation will be described, according to an embodiment.

In a suspend operation, power of the image display apparatus 100 is not completely turned off, and a power consumption of the image display apparatus 100 is minimized. For example, during a suspend operation, a display, an audio output interface (e.g., a speaker, a headphone or the like), a system on chip (SoC) or the like are completely turned off, and power is supplied to a volatile memory performing a self-refresh operation and to modules associated with a resuming operation (for example, a power controller) to drive the volatile memory and the modules. In a suspend operation, the main processor is turned off, but a sub-processor, which is also referred to as a MICOM, is not turned off. The sub-processor is on standby to receive an input signal from a control device (for example, a remote control). As a display is turned off, the image display apparatus 100 is perceived by the user as being turned off.

The image display apparatus 100 may store job details in a non-volatile memory before recovering from an error (that is, before cold-booting), and may move the stored job details to a volatile memory when performing a suspend operation.

Next, external conditions are checked (in operation S341) to resume an execution state of the particular application. That is, the information mode is resumed (in operation S350).

For example, when a sensed value of a sensor (an illuminance sensor or a motion sensor or the like) is greater than a preset threshold value, the information mode may be resumed. That is, when lighting in the space where the image display apparatus 100 is installed is turned on or a movement around the image display apparatus 100 is sensed, the information mode is resumed from the suspend mode. Alternatively, when an application program installed in the image display apparatus 100 is linked to a mobile terminal of a user, and the mobile terminal enters a positional range within a preset distance, the information mode is resumed from the suspend mode.

Next, by requesting mode conversion by inputting an additional information mode key for requesting to convert to the information mode, the information mode may be changed to a normal mode. By using the job details stored in the volatile memory (suspend image), a normal mode may be entered faster than by cold-booting (fast booting).

FIG. 6 is a diagram view illustrating an operation in which, when a normal mode is changed to an execution state of a particular application (information mode) and it is determined that error recovery is possible after identifying the external conditions in the information mode, a suspend operation is performed after error recovery. Also, when it is determined that the information mode is to be resumed as a result of identifying the external conditions during the suspend operation, the image display apparatus 100 enters the information mode. In this case, when a user inputs an input, for example, by pressing a power key in the suspend mode, the operating mode of the image display apparatus 100 is changed to a normal mode.

Figure 7:
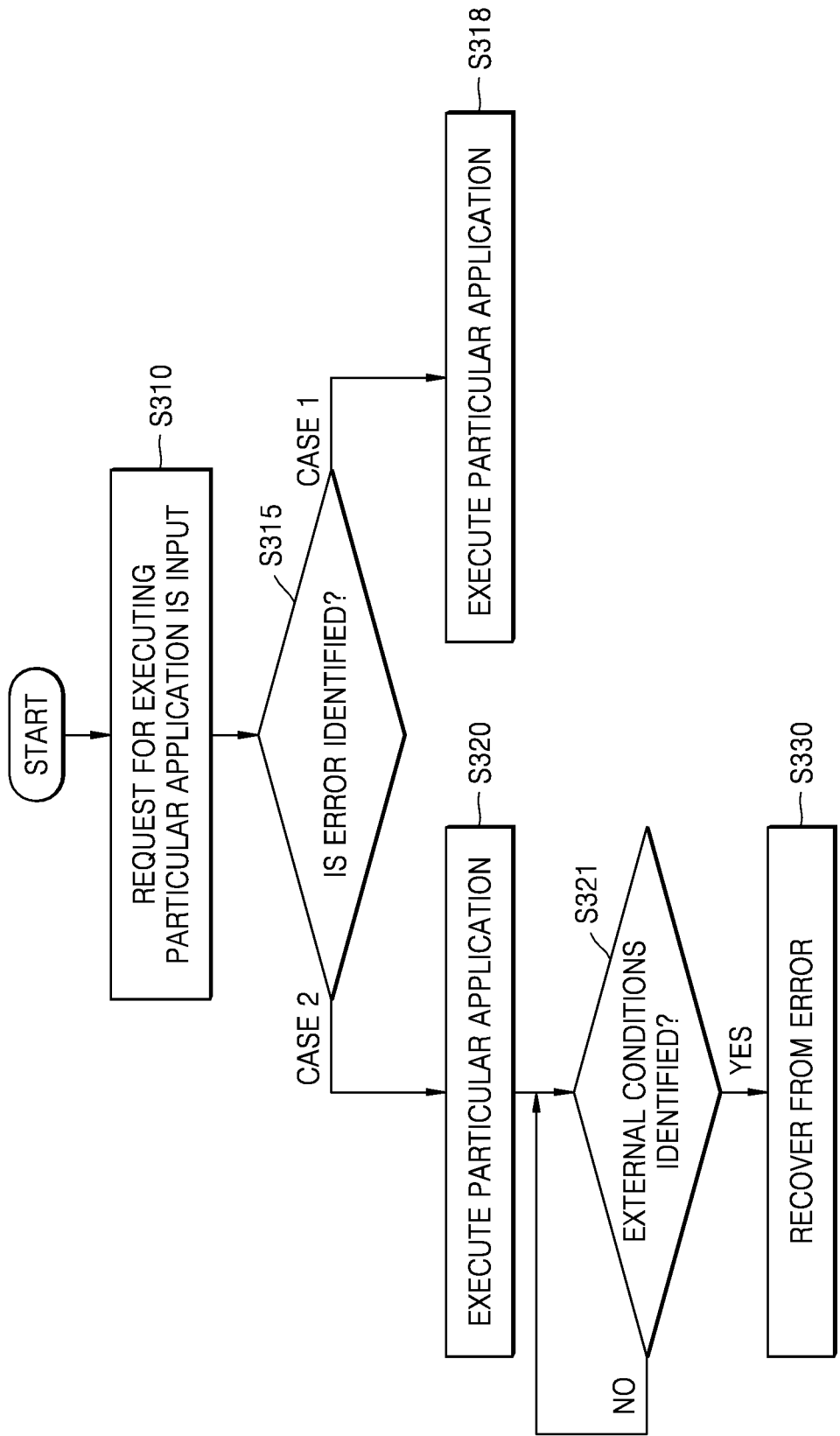
FIG. 7 is a flowchart illustrating a method of operating an image display apparatus according to a fourth embodiment.

FIG. 7 is a flowchart illustrating a method of operating an image display apparatus 100 according to a fourth embodiment. For convenience of description, description will focus on differences from the embodiments of FIGS. 1 through 6.

Referring to FIG. 7, a request for executing a particular application (a request for changing to an information mode) is input (in operation S310). During the execution of an application selected by the user, a request for executing a particular application may be input.

Next, a type of an error of the image display apparatus 100 is identified (in operation S315). A method of identifying an error type, according to an embodiment, will be described later.

When no error occurred or a very small error has occurred (CASE 1), the particular application is executed to enter an information mode (in operation S318), and error recovery is not performed.

On the other hand, when an error is not small (CASE 2), despite the presence of a system error, first, the particular application is executed to enter an information mode (in operation S320). Next, external conditions are identified (in operation S321). As a result of identifying external conditions, when sufficient time for performing a recovery operation is ensured, the image display apparatus 100 recovers from the error (in operation S330).

Figure 8:
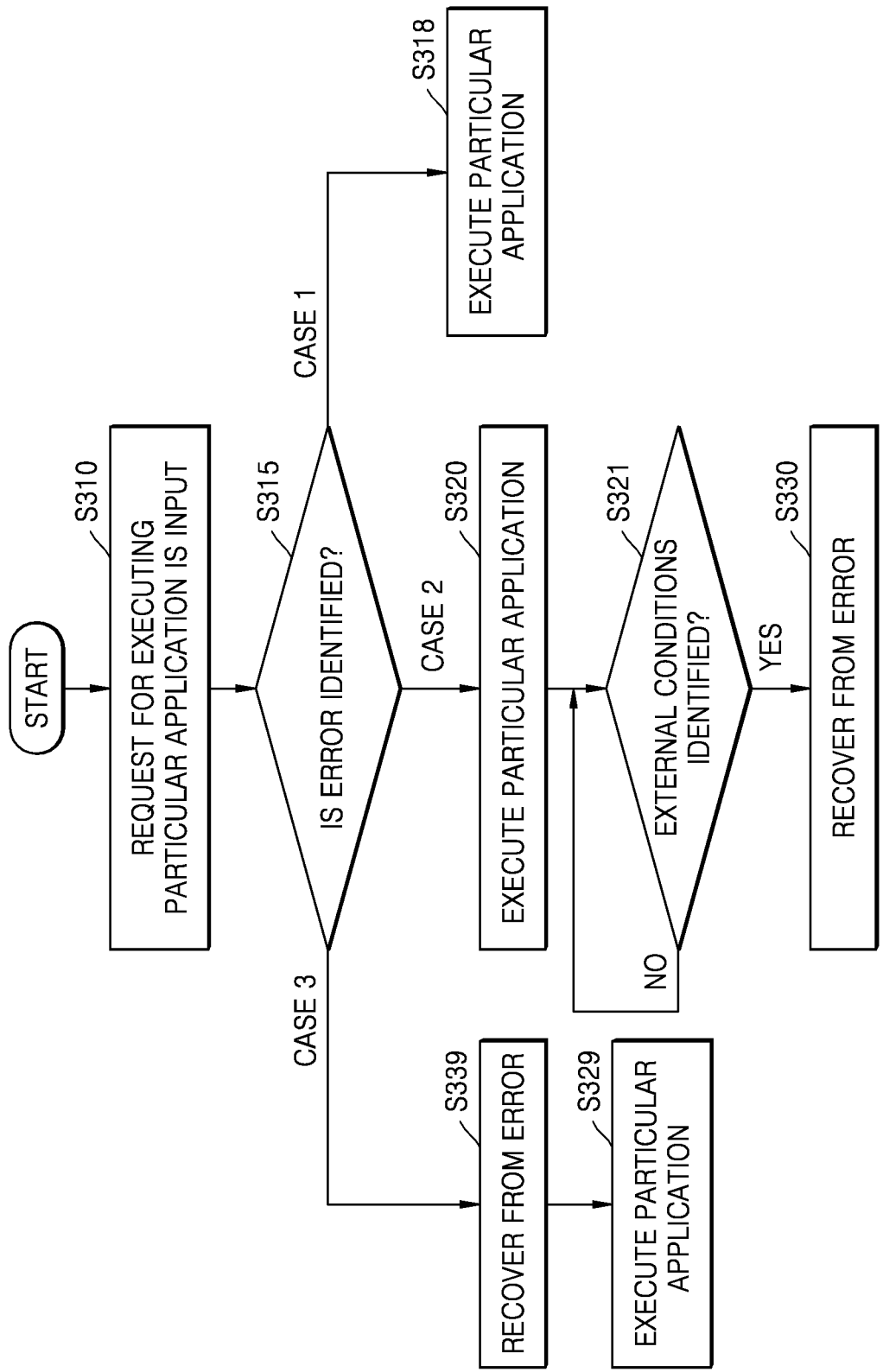
FIG. 8 is a flowchart illustrating a method of operating an image display apparatus according to a fifth embodiment.
Figure 9:
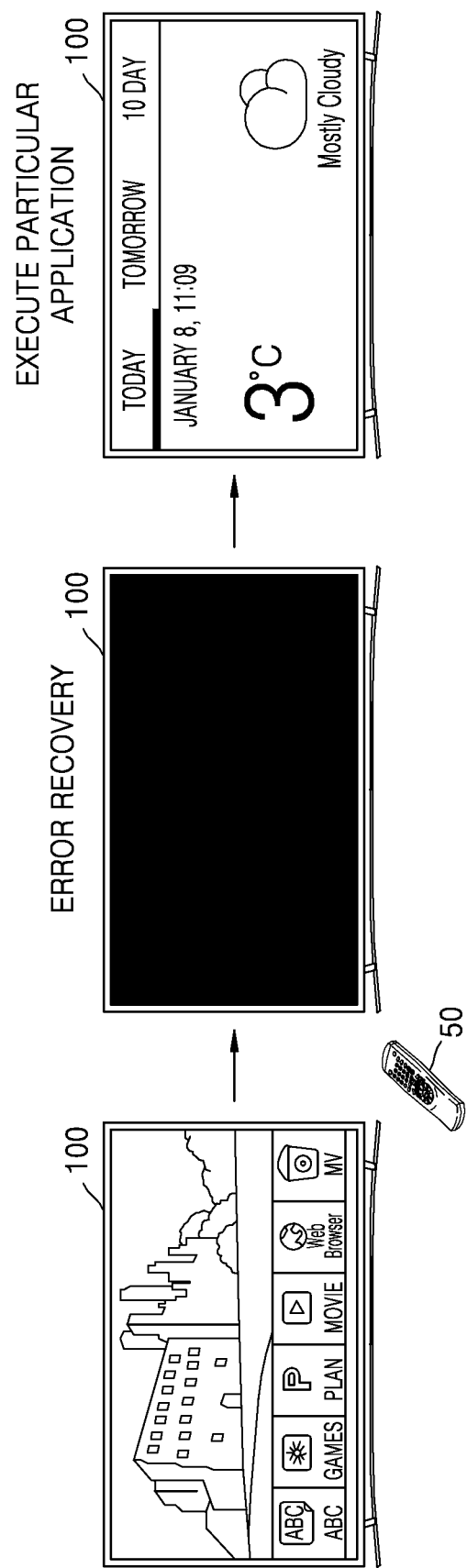
FIG. 9 is a diagram view illustrating a method of operation an image display apparatus such as the method described above with reference to FIG. 8, according to a fifth embodiment.

FIG. 8 is a flowchart illustrating a method of operating an image display apparatus 100 according to a fifth embodiment. FIG. 9 is a diagram view illustrating the operating method of FIG. 8, according to a fifth embodiment. For convenience of description, description will focus on differences from the embodiments of FIGS. 1 through 7.

Referring to FIG. 8, a request for executing a particular application (a request for changing to an information mode) is input (in operation S310). During the execution of an application selected by a user, a request for executing a particular application may be input.

Next, an error type of the image display apparatus 100 is identified (in operation S315).

Depending on the error type identified, the particular application may be executed to enter the information mode and the image display apparatus 100 may not recover from the error, or the particular application may be executed to enter an information mode and then the image display apparatus 100 may recover from the error, or the image display apparatus 100 may recover from the error and then the particular application may be executed and the image display apparatus 100 may enter the information mode.

Identifying an error type may include at least one of identifying free space in a memory for executing a particular application, checking a use rate of a processor, and identifying whether an operating error occurred in the particular application. When there is an error in a particular application for entering an information mode, it is difficult to enter the information mode. In addition, when a free memory space is needed to drive the particular application and the free space is not enough or is not available, it is difficult to enter the information mode.

In detail, according to the fifth embodiment, in CASE 1 where a particular application is executed and no error occurred or only a very small error has occurred, the particular application is executed to enter the information mode (in operation S318), and error recovery is not performed. In this case, since the error recovery is not performed, it may not be necessary to store job details (or the suspend image) in the non-volatile memory. In the case where an error is very small (CASE 1) may be, for example, when an initial crash due to execution of a particular application does not occur, a free memory space is equal to or greater than a first reference value, and a usage rate of a processor is equal to or less than a second reference value.

Alternatively, when the error is simple (CASE 2), a particular application is first executed so that the image display apparatus 100 enters the information mode (in operation S320), and then the image display apparatus 100 recovers from the error (in operation S330) according to the external conditions (in operation S321). The case of a simple error (CASE 2) may indicate, for example, a case when an initial crash due to execution of a particular application does not occur or a case when a free memory space is equal to or less than the first reference value but greater than a required minimum size needed for an execution binary of the particular application to be loaded. The case of a simple error (CASE 2) may also indicate, for example, a case when an initial crash due to execution of a particular application does not occur or a case when a usage rate of the processor is equal to or greater than the second reference value, but less than a maximum processor use rate needed for an execution binary of the particular application to be loaded.

When the error is simple (CASE 2), a point of time of executing the recovery operation (in operation S330) may be determined according to the external conditions. For example, the image display apparatus 100 may receive a position signal from a user's mobile terminal and perform a recovery operation when the mobile terminal is spaced apart from the image display apparatus 100 by a distance more than a preset distance. In addition, the image display apparatus 100 may include at least one sensor (for example, an illuminance sensor or a motion sensor) that senses external conditions, and perform a recovery operation when a sensed value of the sensor is less than a preset threshold value.

In addition, before performing an error recovery operation, job details regarding a normal mode stored in a volatile memory (or a suspend image) may be stored in a non-volatile memory, and then the image display apparatus 100 may be cold-booted.

Alternatively, when the error is serious (CASE 3), as illustrated in FIG. 9, the image display apparatus 100 may recover from the error first (in operation S339), and then the image display apparatus 100 may enter the information mode (in operation S329). Further, before performing an error recovery operation, job details (suspend image) is stored in the non-volatile memory. When the error is serious (CASE 3), the recovery operation (in operation S339) is performed immediately regardless of the external conditions.

The case with a serious error includes at least one of a case where a crash occurs immediately upon execution of a particular application and a case where free memory space is less than a required minimum size for an execution binary of a particular application to be loaded. That is, when error recovery (in operation S339) is performed before entering the information mode (in operation S329), it is difficult to drive the particular application at all.

As described above, except for the case where it is difficult to execute the particular application, the image display apparatus 100 may enter the information mode by executing a particular application before recovering from the error. Therefore, the image display apparatus 100 may recover from the system error when operating in the information mode while the user is unaware of a recovery process. Also, the user may be prevented from experiencing an unexpected abnormal operation of the image display apparatus 100, thereby increasing reliability of the image display apparatus 100.

Although not illustrated in the drawings, when no error occurs or an error is very small (CASE 1), the image display apparatus 100 may enter the information mode (in operation S318), and then enter the suspend mode (not shown) based on the external conditions. As described above, when changing from the normal mode to the information mode, job details in the normal mode are frozen in the volatile memory, and thus, when the user presses a power key in the suspend mode, the normal mode is resumed, and details of the last job may be quickly recovered based on data of the frozen job details.

In addition, although not illustrated in the drawings, when an error is simple (CASE 2), the image display apparatus 100 may recover from the error of the image display apparatus 100 (in operation S330) and then enter a suspend mode based on external conditions. Before performing error recovery (in operation S330), by storing job details of the normal mode that were frozen in the volatile memory, in the non-volatile memory, and moving the job details stored in the non-volatile memory when entering the suspend mode, despite the error recovery (in operation S330), the job details of the last job may be quickly resumed when resuming the normal mode after the suspend mode.

While driving an identical application program (for example, YouTube application program) according to a setting of a manufacturer or a user, a screen corresponding to the normal mode resumed after entering the suspend mode according to the flow of CASE 1 (in operation S318) and a screen corresponding to the normal mode after entering the suspend mode according to the flow of CASE 2 (operations S320, S321, and S330) may not be identical. This is because job details of a third party application are not included in data that is frozen when changing from the normal mode to the information mode, and the third party application implicitly has a function of recovering job details.

For example, it is assumed in the description below that a video was watched for about 10 minutes via a video streaming application program and then the image display apparatus entered the suspend mode. When the normal mode is suspended or resumed according to the flow of CASE 1 (in operation S318), the video is resumed (that is, 10 minutes) from the point of time where watching the video was suspended, and when the normal mode is suspended or resumed according to the flow of CASE 2 (operations S320, S321, and S330), a state where only a YouTube application program is loaded may be resumed.

Hereinafter, referring to FIGS. 10 through 12, the image display apparatus 100 according to some embodiments will be described.

Figure 10:
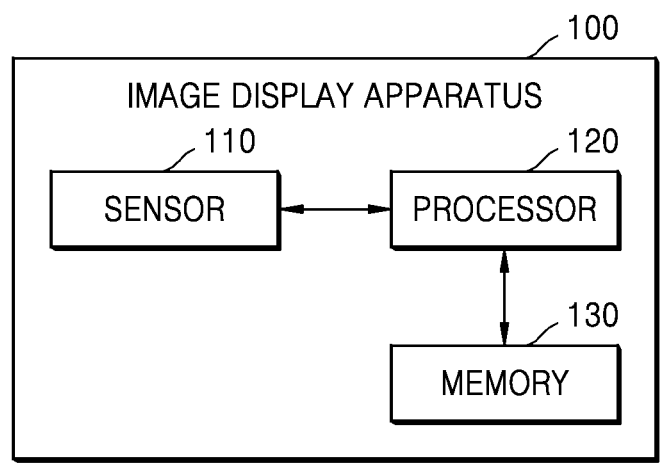
FIG. 10 is a block diagram illustrating an image display apparatus according to the first embodiment.

FIG. 10 is a block diagram illustrating an image display apparatus 100 according to a first embodiment. The image display apparatus 100 of FIG. 10 may use the operating method described with reference to FIGS. 1 through 3.

Referring to FIG. 10, the image display apparatus 100 may include a sensor 110, a processor 120, and a memory 130.

The sensor 110 may receive a user input and transfer a received signal to the processor 120. In addition, the sensor 110 may receive, from the control device 50, a user input such as an input of turning on or off the image display apparatus 100, a channel selection input, a channel up/down input, a screen setting input, or a request for executing a particular application (a request for changing to an information mode). During execution of an application selected by a user, a request for executing a particular application may be input. In addition, the sensor 110 may sense a request for executing a particular application (a request for changing to an information mode) included in the image display apparatus 100. As described above, a request for executing a particular application may be pressing a power key mounted on the control device 50 or the image display apparatus 100 or pressing an additional key for a request for executing a particular application.

In addition, the sensor 110 may sense whether power is supplied from an external power source to the image display apparatus 100. For example, the sensor 110 may sense whether a power plug of the image display apparatus 100 is connected to an external power source or is separated therefrom. In addition, the sensor 110 may sense whether power supply is resumed after an interruption of power supply from an external power source. For example, when a power failure occurs, power supply from an external power source may be interrupted.

The memory 130 may store various types of data or various programs or applications used to be drive or control the image display apparatus 100. A program stored in the memory 130 may be configured by using one or more instructions. A program (one or more instructions) or an application stored in the memory 130 may be executed using the processor 120.

The memory 130 may include a non-volatile memory and a volatile memory. The non-volatile memory may include various types of data and software used to drive and control the image display apparatus 100 (for example, an operating system, an application program, or the like). A non-volatile memory is a memory from which stored data is not removed even when the power supply is interrupted, and may include a flash memory such as a NAND flash, a NOR flash, or the like, but is not limited thereto. A volatile memory is a device from which stored data is removed when the power supply is interrupted, and may include, for example, a static random access memory (SRAM), a dynamic random access memory (DRAM), or the like, but is not limited thereto.

The processor 120 may load software stored in the non-volatile memory, to a volatile memory to drive the software. The processor 120 may access data associated with software loaded in the volatile memory (for example, an operating system, an application program, or the like).

The processor 120 may control an overall operation of the image display apparatus 100 and a signal flow among internal elements of the image display apparatus 100, and process data. The processor 120 controls operation of software stored in the image display apparatus 100 (for example, an operating system, an application program, or the like), and may correspond to a central processing unit (CPU). For example, the processor 120 may load software stored in a non-volatile memory to a volatile memory to execute the software, and may control the image display apparatus 100 via a user command received via the sensor 110 or execution of the software.

In addition, the processor 120 may include a graphics processing unit (GPU, not shown) used for graphic processing corresponding to video. The processor 120 may be implemented using a system on chip (SoC) in which a core (not shown) and a GPU (not shown) are incorporated. The processor 120 may include a single core, a dual core, a triple core, a quad core, and a multiple-core thereof.

In addition, the processor 120 may include a plurality of processors. For example, the processor 120 may be implemented as a main processor (not shown) and a sub-processor (not shown) operating in a suspend mode.

In addition, the processor 120 may execute one or more programs stored in the memory 130, and the programs may include one or more instructions. That is, a processor controls or performs various operations by executing instructions.

In detail, when the sensor 110 receives an input of a request for executing a particular application (a request for changing to an information mode), the processor 120 executes the particular application so that the image display apparatus 100 enters the information mode and controls the image display apparatus 100 to recover from an error in the information mode after entering the information mode. The processor 120 may execute an application selected by a user, and when a request for executing a particular application is input during execution of the selected application, the processor 120 checks an error type of the image display apparatus 100 and determines, based on the checked error type, whether to execute the particular application first and then recover the error or to recover the error of the image display apparatus 100 first and then execute the particular application.

In addition, the processor 120 cold-boots the image display apparatus 100 or closes at least one program to make the image display apparatus 100 recover from the error. The processor 120 may selectively determine to cold-boot the image display apparatus 100 or close at least one program according to the cause of the error.

In addition, after the image display apparatus 100 recovers from the error, the processor 120 controls the image display apparatus 100 to enter a suspend mode.

In particular, when recovering from an error through cold-booting, the processor 120 controls the image display apparatus 100 such that the image display apparatus 100 is cold-booted after storing job details in a normal mode stored in the volatile memory (or a suspend image), in the non-volatile memory. In addition, when the image display apparatus 100 enters the suspend mode, the processor 120 moves the job details stored in the non-volatile memory to the volatile memory. When the image display apparatus 100 returns to the normal mode, the processor 120 controls to fast-boot by using the job details moved to or stored in the volatile memory.

Figure 11:
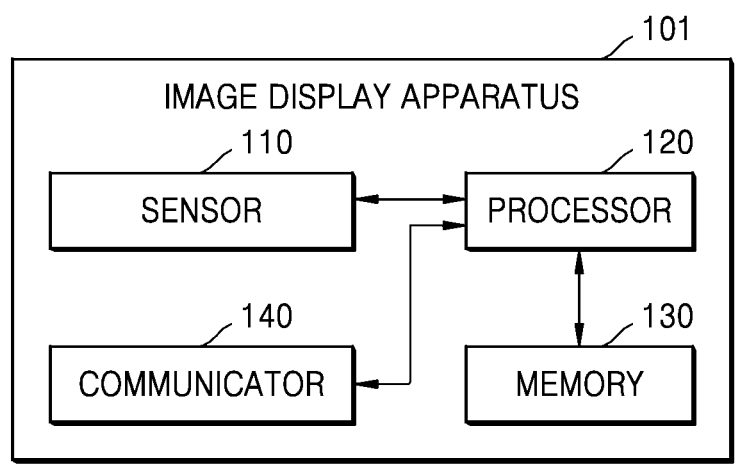
FIG. 11 is a block diagram illustrating an image display apparatus according to the second embodiment.

FIG. 11 is a block diagram illustrating an image display apparatus 101 according to the second embodiment. The image display apparatus of FIG. 11 is just an example of an apparatus using a driving method as described with respect to FIGS. 4 through 9. For convenience of description, the description below will focus on differences from the description provided with reference to FIG. 10.

Referring to FIG. 11, in the image display apparatus 101 according to the second embodiment, the processor 120 may further control the image display apparatus 101 such that a point of time of executing a recovery operation (a starting point of time) is modified based on external conditions.

For example, the image display apparatus 101 may receive a position signal (for example, a GPS signal) from a mobile terminal of a user via a communicator 140, and when the mobile terminal is away from the image display apparatus 101 by more than a preset distance, the image display apparatus 101 may operate such that a recovery operation is performed. The recovery operation may be performed as the user is far away from the image display apparatus 101 and thus there is sufficient time for the recovery operation.

Alternatively or in addition, the sensor 110 includes at least one sensor sensing external conditions. For example, the sensor 110 may include at least one of an illuminance sensor sensing illuminance around the image display apparatus 100 and a motion sensor sensing motion around the image display apparatus 100. When a sensed value of the sensor is less than a preset threshold value, the processor 120 may further control the image display apparatus 101 such that a recovery operation is performed.

When a lower illuminance of the surroundings of the image display apparatus 100 is sensed by the illuminance sensor (that is, when sensing that the surroundings of the image display apparatus 100 become dark), it may be determined that lighting in a space where the image display apparatus 100 is installed is turned off. By using a motion sensor, it may be sensed that there is no movement around the image display apparatus 100. In this case, it may be determined that a user is not present in the space where the image display apparatus 100 is installed. Accordingly, the processor 120 may further control the image display apparatus 101 such that a recovery operation is performed.

While executing an application selected by a user, when the sensor 110 senses a request for changing to an information mode, the processor 120 may further control the image display apparatus 101 such that an error type is determined before the image display apparatus 101 enters the information mode. Identifying an error type includes identifying an amount of free space of the memory 130 needed to enter the information mode and identifying whether a program for entering an information mode has an operating error.

When no error occurs or an error is very small, the processor 120 may control the image display apparatus 101 such that error recovery is not performed after the image display apparatus 101 enters the information mode.

When the error is simple, the processor 120 controls the image display apparatus 100 such that the image display apparatus 100 enters the information mode first, and then recovers from an error in the information mode based on external conditions.

When the error is serious, the processor 120 controls the image display apparatus 101 such that the image display apparatus 100 recovers first from the error, and then the image display apparatus 101 enters the information mode.

Figure 12:
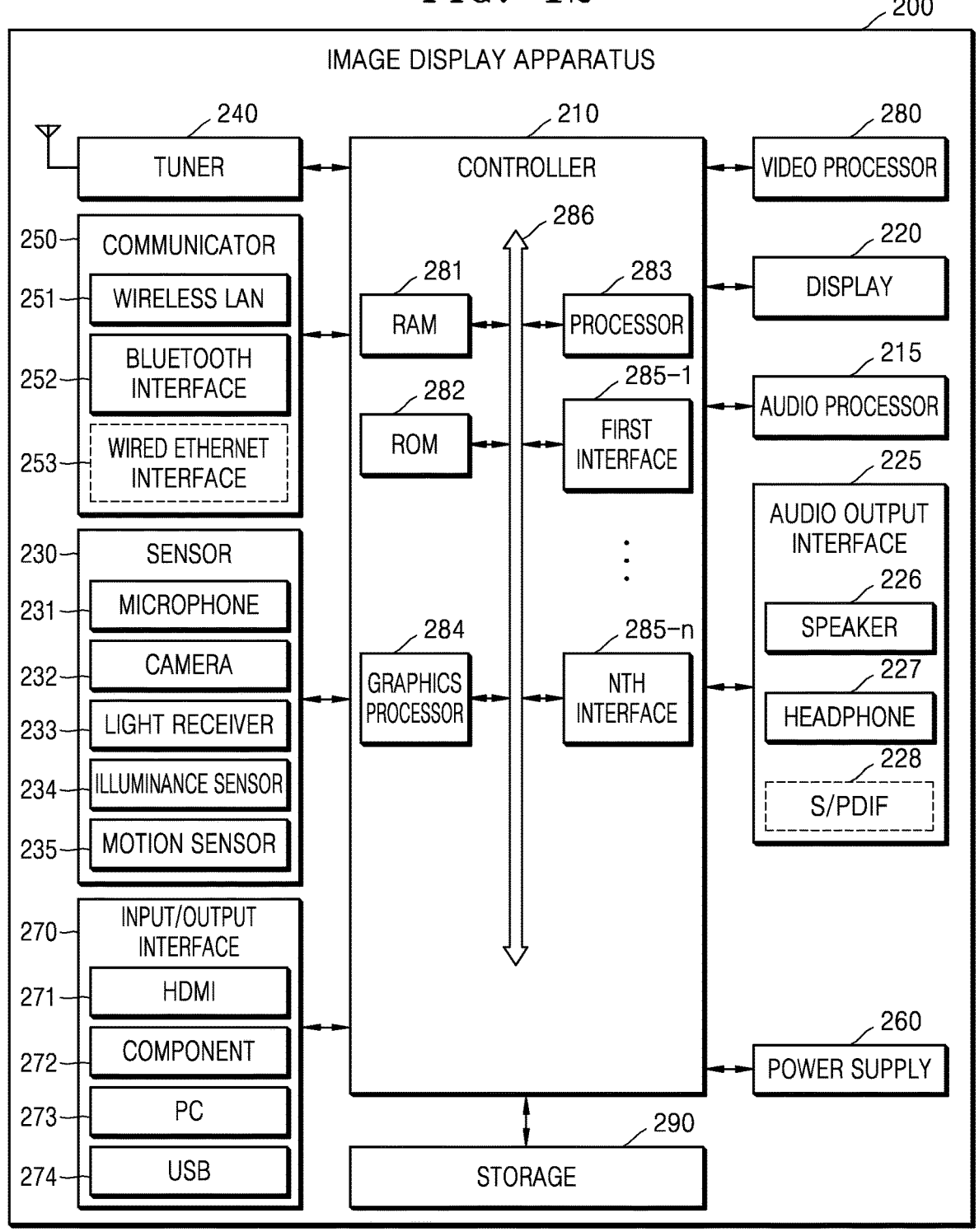
FIG. 12 is a block diagram illustrating an image display apparatus according to the third embodiment.

FIG. 12 is a block diagram illustrating an image display apparatus 200 according to the third embodiment. The image display apparatus 200 of FIG. 12 may be a detailed implementation example of the image display apparatus 100 of FIG. 10 and of the image display apparatus 101 of FIG. 11.

Referring to FIG. 12, the image display apparatus 200 may include a controller 210, a display 220, a sensor 230, a video processor 280, an audio processor 215, an audio output interface 225, a power supply 260, a tuner 240, a communicator 250, and an input/output interface 270, and a storage 290.

The configuration of the image display apparatus 100 illustrated in FIGS. 10 and 11 may also apply to that of the image display apparatus 200 illustrated in FIG. 12. For example, the sensor 110 of FIGS. 10 and 11 corresponds to the sensor 230 of FIG. 12; the processor 120 of FIGS. 10 and 11 corresponds to a processor 283 of FIG. 12; and the memory 130 of FIGS. 10 and 11 corresponds to the storage 290, a random access memory (RAM) 281, and a read-only memory (ROM) 282 of FIG. 12. Thus, repeated description thereof will be omitted.

The video processor 280 processes video data received by the image display apparatus 200. The video processor 280 may perform various types of image processing on video data such as decoding, scaling, noise filtering, frame rate conversion, resolution conversion, or the like.

The display 220 generates a driving signal by changing an image signal, a data signal, an on-screen display (OSD) signal, a control signal or the like that are processed using the controller 210. The display 220 may be implemented using, for example, a plasma display panel (PDP), a liquid crystal display (LCD), an organic light-emitting device (OLED), a flexible display, and also using a three-dimensional (3D) display. In addition, the display 220 may be configured as a touch screen to be used as an input device as well as an output device.

In addition, the display 220 displays a video included in a broadcasting signal received via the tuner 240 according to the control by the controller 210. In addition, the display 220 may display content input via the communicator 250 or the input/output interface 270 (for example, a video). The display 220 may output an image stored in the storage 290 according to the control by the controller 210. In addition, the display 220 may display a voice user interface (UI) (including, for example, a voice guide) for performing a voice recognition task corresponding to voice recognition or a motion UI (including, for example, a user motion guide for motion recognition) for performing a motion recognition task corresponding to motion recognition.

The audio processor 215 performs processing on audio data. The audio processor 215 may perform various types of processing on audio data such as decoding, amplification, or noise filtering. The audio processor 215 may include a plurality of audio processing modules to process an audio signal corresponding to a plurality of contents.

The audio output interface 225 outputs an audio included in a broadcasting signal received via the tuner 240 according to the control by the controller 210. The audio output interface 225 may output an audio (for example, voice or sound) input via the communicator 250 or the input/output interface 270. In addition, the audio output interface 225 may output an audio stored in the storage 290 according to the control by the controller 210. The audio output interface 225 may include at least one of a speaker 226, a headphone output terminal 227, and a Sony/Philips Digital Interface (S/PDIF) output terminal 228. The audio output interface 225 may include a combination of the speaker 226, the headphone output terminal 227, and the S/PDIF output terminal 228.

The power supply 260 may receive main power from an external power source. In addition, the power interface 260 supplies power input from an external power source to internal elements of the image display apparatus 200 according to the control by the controller 210. In addition, the power interface 260 may supply power output from one battery or two or more batteries (not shown) included inside the image display apparatus 200, to internal elements of the image display apparatus 200 according to the control by the controller 210.

The tuner 240 may tune only a frequency of a channel to be received by the image display apparatus 200 and select the frequency of the channel from among various radio waves, by, for example, amplifying, mixing or resonating a broadcasting signal received in a wired or wireless manner. The broadcasting signal includes an audio, a video, and additional information (for example, Electronic Program Guide (EPG)).

The tuner 240 may receive a broadcasting signal in a frequency band corresponding to a channel number (for example, Cable broadcasting No. 506) according to a user input (for example, a control signal received from the control device 50 such as a channel number input, a channel up/down input, and a channel input on an EPG screen).

The tuner 240 may receive a broadcasting signal from various sources such as terrestrial broadcasting, cable broadcasting, satellite broadcasting, and Internet broadcasting. The tuner 240 may also receive a broadcasting signal from a source such as analog broadcasting or digital broadcasting. A broadcasting signal received via the tuner 240 is decoded (for example, through audio decoding, video decoding, or additional information decoding) to be separated into an audio, a video, and/or additional information. The audio, video, and/or additional information may be stored in the storage 290 according to the control by the controller 210.

One or more tuners 240 may be included in the image display apparatus 200. The tuner 240 may be an all-in-one with the image display apparatus 200 or may be implemented as a separate apparatus (e.g., a set-top box, not shown) having a tuner electrically connected to the image display apparatus 200, a tuner (not shown) connected to the input/output interface 270 or the like.

The communicator 250 may connect the image display apparatus 200 to an external device (e.g., an audio device) to the image display apparatus 200 according to the control by the controller 210. The communicator 250 may include one of a wireless local area network (LAN) 251, a Bluetooth interface 252, and a wired Ethernet interface 253 in accordance with a performance and structure of the image display apparatus 200. In addition, the communicator 250 may include a combination of the wireless LAN 251, the Bluetooth interface 252, and the wired Ethernet interface 253. The communicator 250 may receive a control signal of the control device 50 according to the control by the controller 210. The control signal may be implemented as a Bluetooth signal, a radio frequency (RF) signal, or a Wi-Fi signal.

For example, the communicator 250 may receive, via the Bluetooth interface 252, a signal corresponding to a Bluetooth-type user input (e.g., touch, pressing, a touch gesture, a voice, or a motion) from the control device 50.

The communicator 250 may further include other short-range communication (e.g., near field communication (NFC, not shown), Bluetooth Low Energy (BLE, not shown) in addition to the Bluetooth communication).

The sensor 230 may sense a user's voice, a user's image or a user's interaction. The sensor 230 may include, for example, a microphone 231, a camera 232, a light receiver 233, an illuminance sensor 234, and a motion sensor 235, but is not limited thereto.

The microphone 231 receives an uttered voice of a user. The microphone 231 may transform a received voice into an electrical signal and output the signal to the controller 210. The user's voice may include, for example, a voice corresponding to a menu or a function of the image display apparatus 200. The microphone 231 may be implemented as an all-in-one type or a separated type with respect to the image display apparatus 200.

The separated-type microphone 231 may be electrically connected to the image display apparatus 200 via the communicator 250 or the input/output interface 270. It will be obvious to one of ordinary skill in the art that the microphone 231 may be excluded according to a performance and structure of the image display apparatus 200. The microphone 231 may transform a voice corresponding to a power-on command or a power-off command regarding a power of the image display apparatus 200 into an electrical signal and output the electrical signal to the controller 210.

The camera 232 receives an image (the image including, for example, sequential frames) corresponding to a user's motion including a gesture performed within a camera recognition range. A user's motion may include a motion of the body of the user or a motion of a body part of the user, for example, a motion of the face, a facial expression, a fist, or a finger of the user. The camera 232 may transform an image received according to the control by the controller 210 into an electrical signal and output the electrical signal to the controller 210. The camera 232, according to an embodiment, may transform a motion (gesture) corresponding to a power-on or -off command of the image display apparatus 200 into an electrical signal and output the electrical signal to the controller 210.

The controller 210 may select a menu displayed on the image display apparatus 200 based on a received result of motion recognition or conduct control corresponding to the motion recognition result. For example, the control may include channel adjustment, volume control, indicator movement, or cursor movement.

The camera 232 may be of an all-in-one type or a separated type with respect to the image display apparatus 200. When the camera 232 is a separate device, the camera 232 may be electrically connected to the image display apparatus 200 via the communicator 250 or the input/output interface 270. It will be obvious to one of ordinary skill in the art that the camera 232 may be omitted according to a function and structure of the image display apparatus 200.

The light receiver 233 receives an optical signal (including a control signal) received from the control device 50 outside via a light window (not shown) of a bezel of the display 220. The light receiver 233 may receive an optical signal corresponding to a user input (for example, a touch, a pressing, a touch gesture, a voice or a motion) from the control device 50. A control signal may be extracted from the received light signal according to the control by the controller 210.

The light receiver 233 may receive an optical signal corresponding to a request for changing to an information mode of the control device 50 (for example, a power key input).

The illuminance sensor 234 may be of an all-in-one type or a separated type with respect to the image display apparatus 200. The illuminance sensor 234 measures illuminance around the image display apparatus 200. By using illuminance data obtained using the illuminance sensor 234, the processor 283 may control such that a point of time of executing a recovery operation is changed or a suspend mode of the image display apparatus 200 is changed to an information mode.

The motion sensor 235 may be of an all-in-one type or a separated type with respect to the image display apparatus 200. The motion sensor 235 senses motion around the image display apparatus 200. By using motion data obtained using the motion sensor 235, the processor 283 may control the image display apparatus 200 such that a point of time of executing a recovery operation is changed or a suspend mode of the image display apparatus 200 is changed to an information mode.

The input/output interface 270 receives, according to the control of the controller 210, a video (e.g., a moving picture), an audio (e.g., voice, music), additional information (e.g., an EPG), or the like from an external source of the image display apparatus 200. The input/output interface 270 may include one of a High-Definition Multimedia Interface (HDMI) port 271, a component jack 272, a PC port 273, and a universal serial bus (USB) port 274. The input/output interface 270 may include a combination of the HDMI port 271, the component jack 272, the PC port 273, and the USB port 274. It will be obvious to one of ordinary skill in the art that the structure and function of the input/output interface 270 may be variously implemented according to embodiments.

The controller 210 may control an overall operation of the image display apparatus 200 and a signal flow among internal elements of the image display apparatus 200, and process data. When there is a user input or when preset conditions are met, the controller 210 may execute an operating system (OS) and various applications stored in the storage 290.

The controller 210 may include a RAM 281 in which a signal or data is input from the outside of the image display apparatus 200 or which is used as a storage area corresponding to various jobs performed in the image display apparatus 200, a ROM 282 storing a control program for controlling the image display apparatus 200, and a processor 283.

A graphics processor 284 generates a screen including various objects such as an icon, an image, a text or the like by using a calculator (not shown) and a rendering unit (not shown). The calculator calculates a property value such as coordinate values, at which each object is to be displayed, a shape, a size, a color or the like of the objects according to a layout of a screen, by using a user input sensed by using the sensor 230. The renderer generates a screen of various layouts including an object based on the property value calculated by using the calculator. A screen generated using the renderer is displayed within a display area of the display 220.

First through nth interfaces 285-1 through 285-*n* are connected to various elements described above. One of the interfaces may be a network interface connected to an external device through a network.

The RAM 281, the ROM 282, the processor 283, the graphics processor 284, the first through nth interfaces 285-1 through 285-*n* may be connected to each other via an internal bus 286.

According to an embodiment, the term "controller of an image display apparatus", includes the processor 283, the ROM 282, and the RAM 281.

The storage 290 may store various types of data or various programs or applications to drive or control the image display apparatus 200 according to the control by the controller 210. The storage 290 may store a signal or data that is input or output in accordance with driving of the video processor 280, the display 220, the audio processor 215, the audio output interface 225, the power supply 260, the tuner 240, the communicator 250, the sensor 230, and the input/output interface 270. The storage 290 may store a control program for controlling the image display apparatus 200 and a controller, an application initially provided by a manufacturer or downloaded from the outside, a graphical user interface (GPI) related to an application, an object for providing a GUI (for example, an image text, an icon, a button or the like), user information, a document, databases or related data thereto.

According to an embodiment, the term "storage" includes the storage 290, the ROM 282 of the controller, the RAM 281, or a memory card mounted in the image display apparatus 200 (for example, a micro SD card, a USB memory, not shown). In addition, the storage 290 may include a non-volatile memory, a volatile memory, a hard disk drive (HDD), or a solid state drive (SSD).

The storage 290 may include a broadcast receiving module, a channel control module, a volume control module, a communication control module, a voice recognition module, a motion recognition module, a light receiving module, a display control module, an audio control module, an external input control module, a power control module, a power control module of an external device connected in a wireless manner (e.g., Bluetooth), a voice database (DB), or a motion DB, which are not shown. The modules and the databases of the storage 290 that are not illustrated may be implemented, in an image display apparatus, in the form of software to perform a control function of broadcast reception, a channel control function, a volume control function, a communication control function, a voice recognition function, a motion recognition function, a light receiving control function, a display control function, an audio control function, an external input control function, a power control function, or a power control function of an external device connected in a wireless manner (for example, Bluetooth). The controller 210 may perform the functions by using the software stored in the storage 290.

In addition, the image display apparatus 200 having the display 220 may be electrically connected to an external device (e.g., a set-top box, not shown) having a tuner. For example, the image display apparatus 200 may be implemented using an analog TV, a digital TV, a 3D-TV, a smart TV, an LED TV, an OLED TV, a plasma TV, a monitor or the like, but is not limited thereto as will be readily understood by those of ordinary skill in the art.

The block diagrams of the image display apparatuses 100, 101, and 200 illustrated in FIGS. 10 through 12, respectively, are block diagrams of an embodiment. Each component of the block diagrams may be integrated, added, or omitted according to the specifications of the image display apparatus 100, 101, or 200 that is actually implemented. That is, according to necessity, two or more components may be combined into one component or one component may be divided into two or more components. In addition, functions performed in each block are intended to illustrate embodiments, and specific operations or apparatuses thereof do not limit the scope of the present disclosure.

The operating method of the image display apparatus according to embodiments may be embodied as programmed commands to be executed in various computer units, and then may be recorded in a non-transitory computer-readable recording medium. The non-transitory computer-readable recording medium may include one or more of the programmed commands, data files, data structures, or the like. The programmed commands recorded to the non-transitory computer-readable recording medium may be particularly designed or configured for the present disclosure or may be well known to one of ordinary skill in the art. Examples of the non-transitory computer-readable recording medium include magnetic media including hard disks, magnetic tapes, and floppy disks, optical media including CD-ROMs and DVDs, magneto-optical media including floptical disks, and hardware designed to store and execute the programmed commands in ROM, RAM, a flash memory, and the like. Examples of the programmed commands include not only machine code generated by a compiler but also include a high-level programming language to be executed in a computer by using an interpreter.

The computer programs consisting of the programmed commands may be transmitted from a first electronic device to a second electronic device via a network such as the Internet and installed on the second electronic device, and thus may be used in the second electronic device. Examples of the first electronic device and the second electronic device include any of a server device, a physical server belonging to a server pool for a cloud service, and a fixed-type electronic device such as a desktop PC.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims and their equivalents.

What is claimed is:

1. An image display apparatus comprising:
a memory storing instructions; and
a processor configured to execute the instructions to:
in response to a request for executing a designated application being received, identify a type of error occurred in the image display apparatus, and
based on the type of error identified by the processor, determine whether to:
execute the designated application and recover from the error after the designated application is executed by the processor, or
recover from the error and execute the designated application after recovering from the error.

2. The image display apparatus of claim 1, wherein the processor identifying the type of error comprises identifying at least one of a free memory space for executing the designated application, a use rate of the processor, and whether the designated application has an operating error.

3. The image display apparatus of claim 1, wherein the processor is further configured to execute the instructions to:
modify a point of time of executing a recovery operation based on external conditions when the processor determined to recover from the error after the designated application is executed.

4. The image display apparatus of claim 3, wherein the processor is further configured to execute the instructions to:
receive a signal indicating a location of a mobile terminal,
determine a distance between the mobile terminal and the image display apparatus, based on the location of the mobile terminal, and
based on the distance between the mobile terminal and the image display apparatus determined, by the processor, to exceed a first threshold, perform the recovery operation.

5. The image display apparatus of claim 3, further comprising:
at least one sensor configured to sense the external conditions,
wherein the processor is further configured to execute the instructions to execute the recovery operation when a sensed value of the at least one sensor is less than a second threshold.

6. The image display apparatus of claim 1, wherein, based on the processor determining to execute the designated application after the recovering from the error, the processor proceeds to recover from the error regardless of external conditions.

7. The image display apparatus of claim 1, wherein the processor recovering from the error comprises performing at least one of cold-booting the image display apparatus and closing at least one program.

8. The image display apparatus of claim 1, wherein the request for executing the designated application comprises a power key input, and
wherein the designated application is an application displaying at least one of date information, time information, temperature information, weather information, and schedule information.

9. An image display apparatus comprising:
a memory storing instructions; and
a processor configured to execute the instructions to:
in response to receiving a request for executing a designated application, execute the designated application, and
based on a absence of user or user's mobile terminal, reboot to recover from an error of the image display apparatus after executing the designated application,
wherein the error has occurred prior to the executing of the designated application.

10. The image display apparatus of claim 9, wherein the processor recovering from the error comprises performing at least one of cold-booting the image display apparatus and closing at least one program.

11. The image display apparatus of claim 9, wherein the processor is further configured to execute the instructions to perform a suspend operation after the processor recovers from the error.

12. The image display apparatus of claim 11, wherein the memory comprises a non-volatile memory and a volatile memory,
wherein the processor recovering from the error comprises control the non-volatile memory to store job details during the execution of an application prior to the receiving the request for executing the designated application and cold-booting the image display apparatus after the job details are stored in the non-volatile memory, and
wherein the processor is further configured to execute the instructions to move the job details stored in the non-volatile memory to the volatile memory when the processor performs the suspend operation.

13. The image display apparatus of claim 9, wherein the processor is further configured to execute the instructions to modify a point of time of executing an operation of recovering from the error based on external conditions.

14. The image display apparatus of claim 13,
wherein the processor is further configured to execute the instructions to:
receive a signal indicating a location of a mobile terminal,
determine a distance between the mobile terminal and the image display apparatus based on the location of the mobile terminal, and
based on the distance determined to exceed a first threshold, perform the recovery operation.

15. The image display apparatus of claim 13, wherein the image display apparatus further comprises:
at least one sensor configured to sense the external conditions,
wherein the processor is further configured to execute the instructions to execute the recovery operation when a sensed value of the at least one sensor is less than a second threshold.

16. The image display apparatus of claim 9, wherein the processor is further configured to execute the instructions to:
identify, before executing the designated application, a type of the error present in the image display apparatus by identifying a free memory space for executing the designated application, a use rate of the processor, and whether the designated application has an operating error.

17. A method of operating an image display apparatus comprising:
in response to a request for executing a designated application being received, identifying a type of error occurred in the image display apparatus; and
based on the identified type of error, performing one of:
executing the designated application and recovering from the error after the executing of the designated application, and
the recovering from the error and the executing of the designated application after the recovering from the error.

18. The method of claim 17, wherein the identifying the type of error comprises:
identifying a free memory space for executing the designated application, a use rate of a processor of the image display apparatus, and whether the designated application has an operating error.

19. The method of claim 17, further comprising
modifying a point of time of the recovering based on external conditions when the recovering from the error is performed after the executing of the designated application,
wherein the external conditions comprise at least one of a position of a mobile terminal, an illuminance around the image display apparatus, and a motion around the image display apparatus.

20. The method of claim 17, wherein the request for executing the designated application comprises a power key input, and
wherein the designated application is an application displaying at least one of date information, time information, temperature information, weather information, and schedule information.

* * * * *